United States Patent Office 3,725,133
Patented Apr. 3, 1973

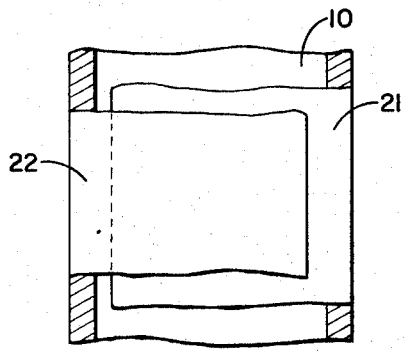
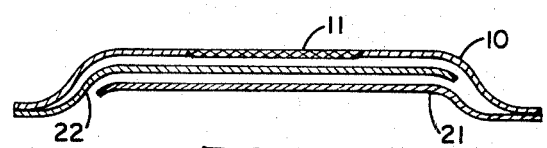
FIG. 5A
FIG. 5B
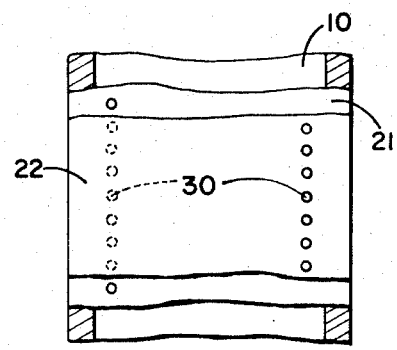
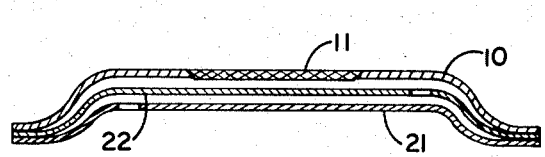
FIG. 6A
FIG. 6B
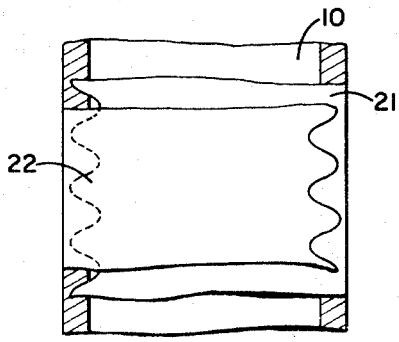
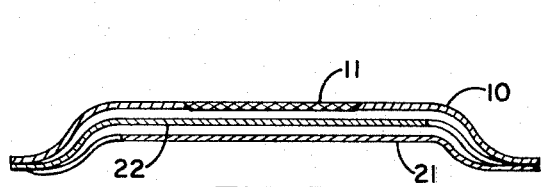
FIG. 7A
FIG. 7B

3,725,133
ELECTRIC CURRENT PRODUCING CELL
Michael J. Pollack, Lansdale, and Evert C. Weidner, Philadelphia, Pa., assignors to Honeywell Inc., Minneapolis, Minn.
Filed Oct. 29, 1970, Ser. No. 85,122
Int. Cl. H01m 21/00
U.S. Cl. 136—114                  1 Claim

ABSTRACT OF THE DISCLOSURE

An inexpensive and simply constructed battery, having good storage properties prior to use. The battery is comprised of an anode, cathode, and a separator located within a first plastic pouch. Also within the first pouch is a second inner pouch containing a solution of electrolyte chemicals. For activation of the battery the inner pouch is ruptured, thereby bringing the electrolyte into contact with the remaining active elements of the battery. A portion of the outside pouch is formed of a gas permeable membrane to allow dissipation of gas and thereby prevent bursting of the battery. To prevent or minimize the likelihood of direct contact by the liquid electrolyte with the permeable membrane, a labyrinth comprised of a pair of overlapping baffles is interposed between the battery and the permeable membrane.

BACKGROUND OF THE INVENTION

Field of the invention

The present invention pertains to reserve primary batteries. It is activated by releasing of a liquid electrolyte which is maintained in a separate container prior to activation.

Description of the prior art

Reserve activated primary batteries are well known in the art. Numerous patents can be found covering a variety of activation mechanisms. A common disadvantage of the prior art reserve activated battery is that the special apparatus required for activation makes them relatively expensive. Except for special applications, where cost is not a primary concern, reserve batteries have not found a wide acceptance.

SUMMARY OF THE INVENTION

The present invention pertains to electric current producing cells or batteries. More particularly it pertains to low cost expendable primary batteries of reserve type which can be activated just prior to use.

One application where the present invention is intended to find use is in toys. Many toys now marketed require flashlight type batteries for their operation. The rapid deterioration and relatively high cost of conventional batteries, when used by children in toys, pose distinct limitations in design and sale appeal for such items. Research into consumers' use and reaction to battery operated products leads to the conclusion that presently available batteries are not economical or practical in terms of "play value." The batteries tend to run down quite rapidly. Studies further indicate that a typical use interval for battery operated toys is in the order of ten minutes. This is reltaed to the attention span of a typical child.

The present invention provides an inexpensive and simply constructed battery which has good storage properties prior to use. It is disposable and is easily replaceable. According to the preferred embodiment, the battery has a short life suited for play use and is intended for consumption in one "play session." Upon depletion, the battery can be replaced at a fraction of the cost of conventional batteries. At the same time, the reserve aspect of the battery assures a fresh battery for each use. When the battery is intended for use by children it is constructed of completely non-toxic materials for reasons of safety.

In the preferred embodiment the battery is of rectangular shape. It is comprised of an outer plastic pouch sealed against passage of liquid and equipped with a pair of thin conductive strips extending from the interior to the exterior of the pouch. Internally, the construction consists of a folded paper web upon which chemical has been deposited, a metal strip, and a smaller thin walled pouch containing a non-toxic solution of electrolyte chemicals. The inner pouch is designed to rupture easily when squeezed through the outer pouch. The rupture of the inner pouch allows the liquid electrolyte to come into contact and react chemically with metal and the chemically treated paper. The two conductive strips protruding through the outer pouch are internally connected to the metal plate (anode) and the chemical on the folded paper web (cathode).

The design of the battery according to the present invention allows an efficient utilization of electrochemical materials in terms of energy produced. The liquid content of the inner pouch is of such quantity that it is mostly absorbed by the paper web when released from the pouch.

Since in the operation of the battery, gases are normally generated, the possibility exists that the external plastic pouch will burst. To alleviate this possibility, the present invention provides a special breather mechanism for dissipating the gas so generated. The breather mechanism must discriminate between gases and liquids. It must allow the gases to pass through and it must retain the liquid electrolyte. To provide this function, a portion of the outside pouch wall is formed of a gas permeable membrane. To minimize the possibility that the liquid electrolyte will seep through the gas permeable membrane, a labyrinth comprised of a pair of overlapping baffles is interposed between the electrolyte and the gas-permeable membrane. When the battery is activated and operated with the gas permeable section in an upward position, the liquid reaction products are highly unlikely to contact the porous membrane section.

Where the battery is intended for use in toys, care must be taken to select materials which are non-toxic. This limits drastically the number of materials which can be employed usefully, since materials capable of generating high energy densities are inherently toxic.

In the preferred embodiment of the present invention the anode is constructed of a magnesium or magnesium alloy, the separator is a non-woven fabric (paper), the cathode is a composition of manganese dioxide and carbon, and the electrolyte is a water solution of potassium chloride. The cathector (cathode collector) is a graphite or metallized film applied to the separator paper in sufficient quantity to assure electrical conductivity. A thickness of several angstroms is required for satisfactory operation. Both the outer and the inner pouches are constructed of heat sealable film such as polyethylene film. A portion of a wall of the outer pouch is constructed of a gas permeable membrane to alleviate the pressure of the gas generated during the operation of the battery. The permeable membrane used in the preferred embodiment is a film of fibrous polyolefin (such as Du Pont Tyvek). Polyolefin has the further advantage in that it is hydrophobic, further minimizing the possibility of electrolyte leakage. A labyrinth constructed of two overlapping baffles of heat sealable film such as polyethylene is attached to the interior of the outer pouch at the point of the permeable membrane, to prevent direct contact between the electrolyte and the permeable membrane. The labyrinth could be improved by additional baffles.

An object of the present invention is to provide an improved reserve primary battery.

A further object of the present invention is to provide a reserve primary battery which is inexpensively constructed and can be used as a replaceable power source for electrically powered toys.

Another object of the present invention is to provide a replaceable power source which is safe for use by children.

These and further objects will become apparent to those skilled in the art upon examination of the specification, the drawings, and the claims which follow.

BRIEF DESCRIPTION OF THE DRAWINGS

FIGS. 5A, 5B, 6A, 6B, 7A and 7B illustrate the various embodiments of the gas permeable membrane and the labyrinth construction for use in a battery according to the present invention.

DESCRIPTION OF THE PREFERRED EMBODIMENTS

Figure 1:
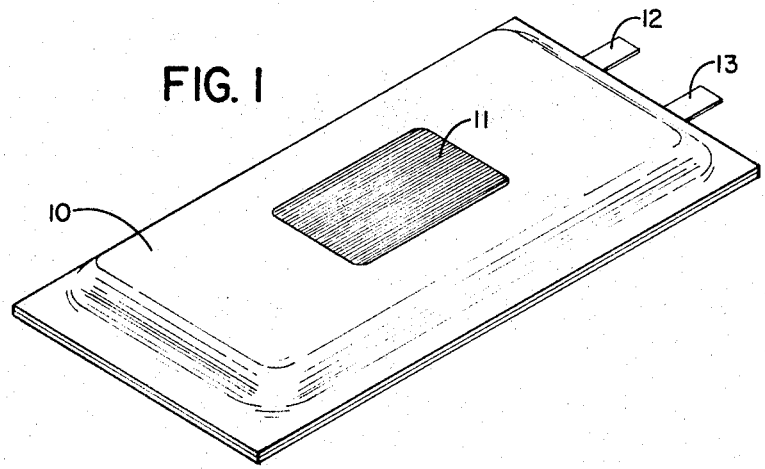
FIG. 1 is a top view of a battery according to the present invention.

FIG. 1 shows an external view of the preferred embodiment of a battery according to the present invention. An outer pouch 10 is constructed of polyethylene film to prevent leakage of liquid from the inside. The upper segment of pouch 10 has a window or an opening which is covered by a gas permeable membrane 11. The function of membrane 11 is to allow gases which may be generated internally by the operation of the battery, to escape and thereby prevent excessive build up of internal pressure. Without this feature, the internal pressure could exceed the strength of the outer pouch 10 and cause it to burst. Membrane 11 is constructed of film of fibrous polyolefin film, such as, for example, Tyvek manufactured by Du Pont.

A pair of conductive strips 12 and 13 protrude through one end of the outer pouch 10 to provide electrical paths from the interior to the exterior of pouch 10.

Figure 2:
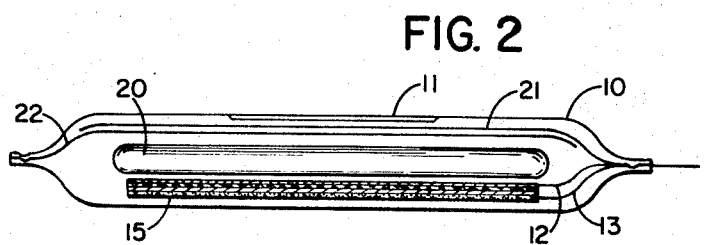
FIG. 2 is a cross sectional view of the battery of FIG. 1, illustrating the internal structure of a reserve primary battery according to the present invention.
Figure 3:
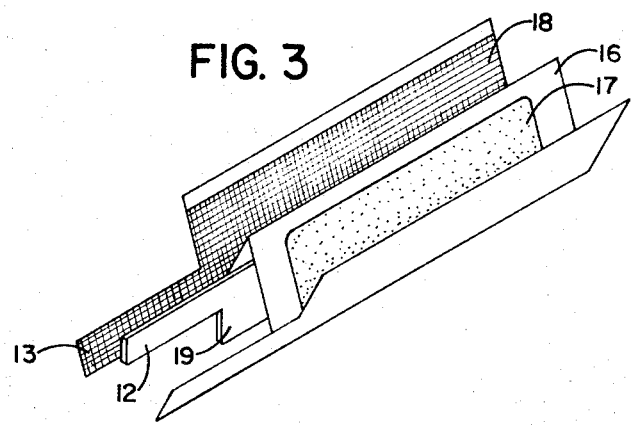
FIGS. 3 and 4 illustrate the preferred embodiment of the cell structure for use in the battery of FIGS. 1 and 2.
Figure 4:
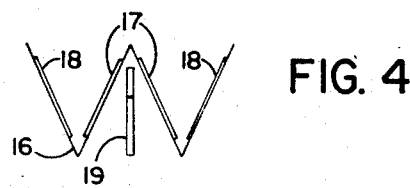

The interior structure of a reserve battery according to the present invention is shown in FIG. 2. A cell stack 15, comprised of one or more cells, is located at the lower end of pouch 10. In FIG. 3 the preferred embodiment of the cell structure is shown. A separator 16 of nonwoven fabric, such as paper, is cut to proper width and folded into a W form to provide eight surfaces. An anode 19 of magnesium or magnesium alloy metal is cut to correspond roughly to the shape and area of one of the surfaces of separator 16. Anode 19 is positioned between the central pair of separator surfaces.

A cathode composition 17 is deposited on the surfaces of separator 16 facing away from the centrally located anode 19, such that the final assembly results in a thickness of separator between the anode and the cathode. On the inside surfaces of the outside folds of the separator is applied a graphite or metallized film 18 in sufficient quantity to assure electrical conductivity. Conductive film 18 serves as a cathector (cathode collector) and is connected to conductive strip 13 protruding through outer pouch 10 for connection to a load (not shown).

Referring again to FIG. 2, just above element stack 15 is shown an inner pouch 20. Inner pouch 20 is constructed of polyethylene film and is filled with an electrolyte solution. Inner pouch 20 is further designed in such a way that it bursts easily under application of a moderate amount of pressure, such as by squeezing between two fingers.

Activation of the battery in FIG. 2 is achieved by squeezing the battery until inner pouch 20 bursts and the electrolyte is brought into contact with cell stacks 15.

A labyrinth arrangement comprised of two overlapping polyethylene baffles 21 and 22 is attached to the inner upper walls of outer pouch 10 to prevent direct contact between the liquid electrolyte and gas permeable membrane 11. As shown in the drawing, baffle 21 of the labyrinth is attached to the right side of the outer pouch and extends virtually the entire distance of the upper wall of pouch 10. It is not attached on the left side of the pouch. On the other hand, baffle 22 is attached on the left side of the pouch, also extending virtually the entire width of pouch 10 and not being attached at the right side. Any gases generated by the operation of the battery, if they are to escape through permeable membrane 11, must first pass between the overlapping baffles 21 and 22. This arrangement reduces the possibility that the liquid will come into contact with membrane 11, thereby either leaking through the pouch to the outside or blocking the passage of gas through the membrane. For optimum operation, the battery must be oriented with the permeable membrane portion facing upwards after activation.

A number of modifications are possible in the structure of the labyrinth. Three basic variations of the design are illustrated in FIGS. 5A, 5B, 6A, 6B, 7A and 7B. FIGS. 5A and 5B represent the structure also shown in FIG. 2. FIGS. 6A and 6B show an arrangement where the two baffles of the labyrinth are securely attached at both ends of the baffles and a plurality of apertures or slits 30 are provided in the two baffles at the opposite ends of the pouch. The escaping gas must, as in the case of the arrangement of FIGS. 5A and 5B, pass between the two baffles before it can reach the permeable membrane.

The embodiments shown in FIGS. 7A and 7B are quite similar to those shown in FIGS. 6A and 6B. The opposing edges of the two baffles are scalloped to provide the openings for the passage of the gas. The choice among the above modifications is dictated by production and applications considerations. To further decrease the likelihood of moisture leakage, additional baffles can be added to the labyrinth. The simple arrangement of FIGS. 5A and 5B has been found to work satisfactorily.

The following is a specific example of a battery according to the present invention.

Outer pouch is constructed of one layer of polyethylene and one layer of polyolefin each 1.4 inches wide, 2.5 inches long and approximately .003 inch thick.

Labyrinth is constructed of two layers of polyethylene 1.3 inches wide, 2.5 inches long and .003 inch thick.

Inner pouch has a rectangular shape approximately 1 inch wide and 1.5 inches long. It is constructed of polyethylene film .003 inch thick. The pouch is approximately .2 inch thick when filled with 2.0 cc. of electrolyte.

Anode is constructed of magnesium or magnesium alloy metal .010 inch thick, .75 inch wide and 1.5 inches long.

Separator is constructed of non-woven fabric (paper) cut to proper width for eight sides W fold. The total separator area is approximately 7.8 square inches.

Cathode is a composition 68.5% by weight manganese dioxide and 31.5% by weight carbon. The cathode composition is pasted onto the separator into two strips each approximately .5 inch wide and 1.37 inches long. The total weight of the cathode composition in the battery is approximately 1 gram.

Cathector is a graphite film applied to the separator paper in sufficient quantity to assure electrical conductivity. A layer of at least several angstroms in thickness is required.

Electrolyte is a 30 weight percent solution of potassium chloride in water.

All of the substances used in the construction of the battery according to this example are non-toxic and do not generate any toxic products during the operation.

This is a requirement, if the battery is to be used in toys. When activated by exerting sufficient external force to rupture the inner pouch containing the electrolyte, the battery of this example will typically generate an output voltage of about 1.0 to 1.6 volts under load. It will supply power of .5 watt for a period of ten minutes when connected to a 2 ohm resistive load.

Clearly, the example given above is for illustration purposes only and many variations in both chemistry and structure are possible without departing from the spirit of the present invention. For example, if nontoxicity is a prerequisite, the cells disclosed in pending application Ser. No. 759,024 can be employed. For many uses, however, toxicity is not a problem and a much wider selection of materials are available, as will be readily understood by those skilled in the art of electric current producing cells.

We claim:

1. In a reserve activated battery, having:
   an outer pouch;
   an anode and a cathode spaced by a separator, positioned within said outer pouch;
   an inner pouch containing a solution of chemicals positioned within said first pouch, said inner pouch being designed to rupture when squeezed, to thereby activate the battery by bringing the electrolyte into contact with said anode and said cathode; and
   a gas permeable membrane forming a portion of the surface of said outer pouch to allow dissipation of gas from the inside to the outside of said outer pouch;
   the improvement comprising a labyrinth means comprising a plurality of overlapping baffles interposed between said permeable membrane and said inner pouch, to prevent direct contact of the liquid electrolyte with said permeable membrane.

References Cited

UNITED STATES PATENTS

| | | | |
|---|---|---|---|
| 3,222,225 | 12/1965 | Amiet et al. | 136—114 |
| 2,862,038 | 1/1958 | Blaru | 136—113 |
| 3,294,589 | 12/1966 | Barrett | 136—114 |
| 3,507,708 | 4/1970 | Vignaud | 136—177 |
| 2,798,112 | 7/1957 | Ruben | 136—113 |
| 2,694,745 | 11/1954 | Kennedy et al. | 136—163 |

WINSTON A. DOUGLAS, Primary Examiner

C. F. LEFEVOUR, Assistant Examiner

U.S. Cl. X.R.

136—90